(12) United States Patent
Schwarzbich

(10) Patent No.: US 6,942,417 B2
(45) Date of Patent: Sep. 13, 2005

(54) TELESCOPIC MECHANISM

(76) Inventor: Jörg Schwarzbich, Wertherstrasse 15, Bielefeld (DE), D-33615

( * ) Notice: Subject to any disclaimer, the term of this patent is extended or adjusted under 35 U.S.C. 154(b) by 0 days.

(21) Appl. No.: 10/030,445

(22) PCT Filed: Apr. 24, 2001

(86) PCT No.: PCT/EP01/04583
§ 371 (c)(1),
(2), (4) Date: Jan. 8, 2002

(87) PCT Pub. No.: WO01/89909
PCT Pub. Date: Nov. 29, 2001

(65) Prior Publication Data
US 2003/0006600 A1 Jan. 9, 2003

(30) Foreign Application Priority Data
May 19, 2000 (DE) ..................................... 200 08 927 U
Aug. 21, 2000 (DE) ..................................... 200 14 397 U

(51) Int. Cl.$^7$ ................................................. F16B 7/10
(52) U.S. Cl. ..................................... 403/109.1; 403/229
(58) Field of Search ................................ 403/80, 109.1, 403/109.8, 229, 377; 72/368, 379.2; 464/162, 167, 180; 74/492, 493; 384/48, 50, 51, 53–59

(56) References Cited

U.S. PATENT DOCUMENTS

| | | | | |
|---|---|---|---|---|
| 1,617,613 A | | 2/1927 | Wells ........................ 384/566 |
| 3,365,914 A | * | 1/1968 | Asher ........................ 464/167 |
| 3,402,574 A | * | 9/1968 | Hauptman .................... 464/63 |
| 3,410,618 A | | 11/1968 | Harris et al. |
| 3,497,890 A | * | 3/1970 | Coyle ......................... 470/25 |
| 3,591,906 A | * | 7/1971 | Lieber ...................... 29/898.03 |
| 3,659,909 A | * | 5/1972 | Egbert ........................ 384/56 |
| 3,757,601 A | * | 9/1973 | Burke ......................... 74/492 |
| 3,887,155 A | * | 6/1975 | Bertalot ...................... 248/333 |
| 3,930,693 A | | 1/1976 | Bowen |
| 4,103,514 A | * | 8/1978 | Grosse-Entrup ............ 64/23.7 |
| 4,737,216 A | * | 4/1988 | Lounsbury, Jr. et al. .... 156/187 |
| 4,898,566 A | * | 2/1990 | Hakansson .................. 464/167 |
| 5,004,203 A | * | 4/1991 | Fabius ...................... 248/276.1 |
| 5,320,374 A | * | 6/1994 | Farris et al. ................. 280/276 |
| 5,345,679 A | * | 9/1994 | Lennon et al. .......... 29/898.055 |
| 6,189,843 B1 | * | 2/2001 | Pfister ........................ 248/161 |
| 6,348,816 B1 | * | 2/2002 | Havens et al. .............. 248/161 |
| 6,350,203 B1 | * | 2/2002 | Zernickel .................... 464/167 |
| 6,505,969 B2 | * | 1/2003 | Senger ......................... 384/56 |
| 6,533,459 B2 | * | 3/2003 | Podhajecki et al. ........... 384/57 |

FOREIGN PATENT DOCUMENTS

| | | |
|---|---|---|
| CH | 117835 | 12/1926 |
| DE | 604831 | 11/1934 |
| DE | 8202069 | 6/1982 |
| DE | 3813422 | 11/1989 |
| DE | 3809906 | 5/1991 |
| DE | 19734980 | 2/1999 |
| EP | 0111439 | 6/1984 |
| EP | 0281723 | 9/1988 |
| GB | 530342 | 12/1940 |
| GB | 1450124 | 9/1976 |
| JP | 48-028979 | 9/1973 |

(Continued)

OTHER PUBLICATIONS

Hyatt Roller Bearing, Oct. 1939, pp. 1C and 4B.

*Primary Examiner*—Robert J. Sandy
*Assistant Examiner*—Ruth C. Rodriguez
(74) *Attorney, Agent, or Firm*—Richard M. Goldberg

(57) ABSTRACT

A telescopic mechanism, especially for steering columns of motor vehicles, with an internal element (10), which has a flattening (12) at least on one side, and an external element (14), which is complementary to the internal element (10) and in which the internal element is guided with roll barrels, which roll at the flattening (12), wherein at least some of the roll barrels are constructed as hollow elasticity bodies (18).

20 Claims, 2 Drawing Sheets

FOREIGN PATENT DOCUMENTS

| | | |
|---|---|---|
| JP | 49-10505 | 10/1974 |
| JP | 59-077123 | 5/1984 |
| JP | 59-077124 | 5/1984 |
| JP | 59077124 | 5/1984 |
| JP | 60-139918 | 9/1985 |
| JP | 03-277809 | 12/1991 |
| JP | 04-123775 | 11/1992 |

* cited by examiner

TELESCOPIC MECHANISM

BACKGROUND OF THE INVENTION

The invention relates to a telescopic mechanism, especially for steering columns of motor vehicles, with an internal element, which has a flattening on at least one side, and an external element, which is complementary to the internal element and in which the internal element is guided with roll barrels, which roll at the flattening.

For motor vehicles with a positively adjustable steering wheel and/or a safety steering column, the steering column must have a telescopic mechanism, which enables the length of the steering column to be adjusted, so that the position of the steering wheel can be adapted to the respective seated position of the driver and/or so that the steering column can shorten itself in the event of a collision. The internal element and the external element are guided telescopically within one another and together form the steering column. For example, the external element is connected at one end with the steering mechanism, while the internal element carries the steering wheel at the opposite end. The telescopic mechanism is intended to make a smooth axial adjustment of the internal element relative to the external element possible. On the other hand, however, it is to ensure a clearance-free and symmetrical transfer of the steering torque from the internal element to the external element. In this connection, symmetrical means that the twisting of the internal element relative to the external element, which is caused by the torque exerted on the steering wheel, is independent of the direction of action of this torque, so that the same steering sensation is impacted to the driver, no matter which direction the steering wheel is turned.

SUMMARY OF THE INVENTION

It is an object of the invention to create a telescopic mechanism, for which the clearance between the internal element and the external element, present in the direction of rotation, is reduced to a minimum, without interfering with the smooth axial displacement.

Pursuant to the invention, this object is accomplished owing to the fact that at least some of the roll barrels are constructed as elastic, hollow bodies.

In conventional roller bearings, the roll bodies are constructed as rolls, which are solid and practically not deformable. On the other hand, the inventive hollow bodies, which are provided instead of the rolls, have a certain elastic deformability, so that they adapt automatically to the clearance between the flattening of the internal element and the opposite flattening of the external element. At the same time, the external cross section of the hollow body, which is circular in the unstressed state, is deformed slightly to an oval state. During the rolling motions, which occur during the axial displacement of the telescopic mechanism, there is a continuous elastic deformation, during which the oval constantly changes its orientation relative to the hollow body, yet retains its eccentricity. This elastic deformation offers only a slight resistance to the rolling motion and, with that, to the axial displacement of the internal part relative to the external part, so that a smooth displacement becomes possible. However, since the hollow bodies constantly lie under tension against the internal part as well as against the external part, there is no clearance during a rotation of the internal part. As a result of the torque, acting on the internal part, the cross section of the hollow body is flattened more at one end than at the other, so that the internal element is twisted slightly relative to the external element. If the torque acts in the opposite direction, this deformation takes place at the opposite end of the helical spring. However, the extent of the deformation depends only on the magnitude of the torque and not on its direction. To a first approximation, the extent of the twisting is proportional to the torque applied and, by selecting a suitable hardness for the hollow bodies, can be adjusted so that a secure steering sensation is imparted to the driver.

In addition, when the inventive telescopic mechanism is used in the steering column of a motor vehicle, the advantage arises that, due to the elastic deformability of the hollow bodies, a certain vibrational damping is achieved, so that vibrations from the steering mechanism are not transferred or transferred only to a lesser extent to the steering wheel.

Preferably, the hollow bodies are formed by helical springs, which preferably are tension springs, the coils of which, in the unstressed state, are coiled on block. The spring steel wire, from which the helical springs are coiled, may have a rectangular or square cross section, so that the external configuration of the helical spring is very similar to the configuration of a conventional roll-shaped roll barrel.

In a different embodiment, the roll barrels are constructed as hollow cylinders, for example, as small seamless tubes or as blanks from spring steel sheet, which are rolled up into a hollow cylinder and the ends of which abut one another at a seam. In the latter case, the seam preferably extends in a zigzag or undulating fashion or it extends in at least one complete turn about the periphery of the cylinder, so that, during the overrolling of the seam, there is no significant change in the elastic formation resistance.

The roll barrels can be held in the usual manner in a cage.

The external cross section of the internal element and the internal cross section of the external element preferably have the shape of a regular polygon, such as that of an equilateral triangle, so that there are three flattenings at the internal element, which are supported, in each case, over a set of roll barrels at the external element.

The cage, which may be formed, for example, by an injection molded plastic part, has a number of sections, which corresponds to the number of sides of the polygon and in each case take up one set of roll barrels. Preferably, these sections are connected with one another over flexible cross members. Initially, the cage can be produced as a flat tape, in which the individual roll barrels can be inserted or clipped without problems. It is then folded into a polygon and placed around the internal element and pushed axially into the space between the internal element and the external element.

The thickness of the individual cage sections can be adapted to the clearance between the internal element and external element, taking into consideration unavoidable tolerances, so that the internal element is supported directly over the cage at the external element, when the elastic deformation of the hollow bodies exceeds a certain value. In this way, the maximum twisting between the internal element and the external element can be limited by a suitable configuration of the cage. Alternatively or in addition, for limiting the twisting, it is also possible to insert in each hollow body a solid roll, which lies with a certain clearance in the hollow body and limits the extent of the elastic flattening of the hollow body. Furthermore, it is conceivable to insert alternatingly hollow bodies and solid rolls as roll barrels in the windows of the cage. The rolls then have a somewhat smaller diameter than the hollow bodies, so that they lie with clearance between the internal element and the external element and limit only the deformation of the hollow bodies.

BRIEF DESCRIPTION OF THE DRAWINGS

In the following, preferred examples of the invention are described in greater detail by means of the drawing, in which.

DETAILED DESCRIPTION

Figure 1:
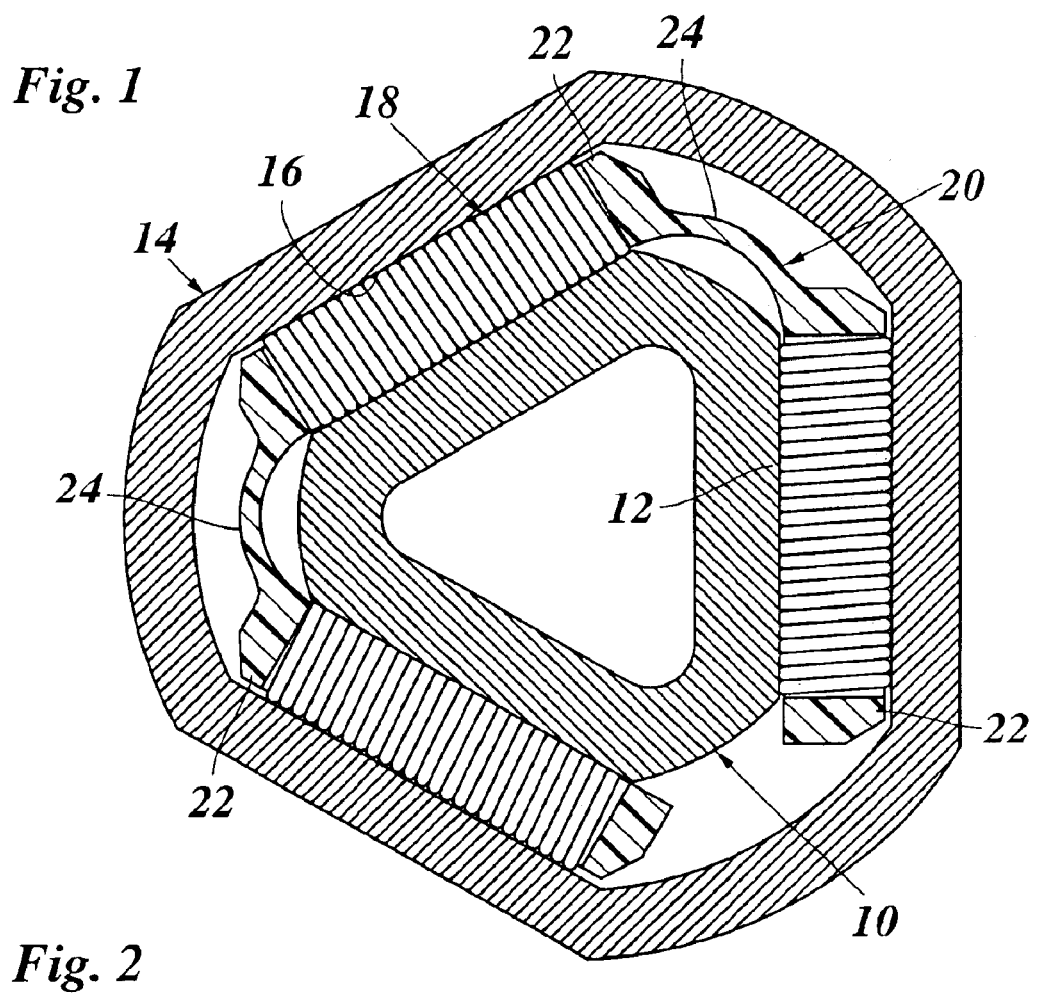
FIG. 1 shows a telescopic mechanism in cross section.

The telescopic mechanism, shown in FIG. 1, has an internal element 10, which is formed as an extruded profile of metal, for example of steel and the external cross section of which has the shape of an equilateral triangle, which is rounded off at the corners and thus forms three flattenings 12, which are disposed at equal angular intervals. The internal element 10 is surrounded at a distance by an external element 14, which is also an extruded metal profile and the internal cross section of which is fitted to the external cross section of the internal element and thus also forms three flattenings 16, which are opposite, parallel to and at a distance from those of the internal element. The spaces between the mutually facing flattenings 12 and 16 of the internal element and of the external element are filled, so that there is no clearance, with roll barrels, which are formed by helical springs 18, which are coiled on block. The helical springs 18 roll with their external periphery on the flattenings 12 and 16 in much the same way as roll barrels of a conventional roller bearing, so that a smooth axial displacement of the internal element 10 relative to the external element 14 becomes possible.

The helical springs 18 are held in a one-piece plastic cage 20. The cage 20 forms three thickened sections 22, which are connected to one another by two flexible cross members 24. Each section 22 takes up one set of helical springs 18, which lie one behind the other in the axial direction that is, in the direction perpendicular to the plane of the drawing of FIG. 1 and, in this way, ensure stable guidance of the internal element 10 in the external element 14.

As an example, it can be assumed that the internal element 10 and the external element 14 together form a steering column, the length of which can be adjusted. The steering wheel is then attached either to the internal element 10 or to the external element 14, while the respective other component is connected with the steering mechanism. In the example considered here, the internal element 10 is to be connected with the steering wheel. When the driver turns the steering wheel, the torque, exerted on the internal element 10, is transferred without clearance by the helical springs 18 to the external element 14. At the same time, the cross section of the helical springs is deformed slightly to an oval. If a torque acts in the clockwise direction shown in FIG. 1, the ends of the helical springs 18, pointing in the counter-clockwise direction, are compressed between the internal element 10 and the external element 14. The maximum deformation is then attained, when the thickened sections 22 of the cage are clamped between the flattenings 12 and 16. In this state, the axial displacement of the telescopic mechanism would be greatly restrained by the frictional forces of the cage 20. However, in the present case, this is not harmful, since an axial displacement for setting the position of the steering wheel normally is carried out in the torque-free state.

Figure 2:
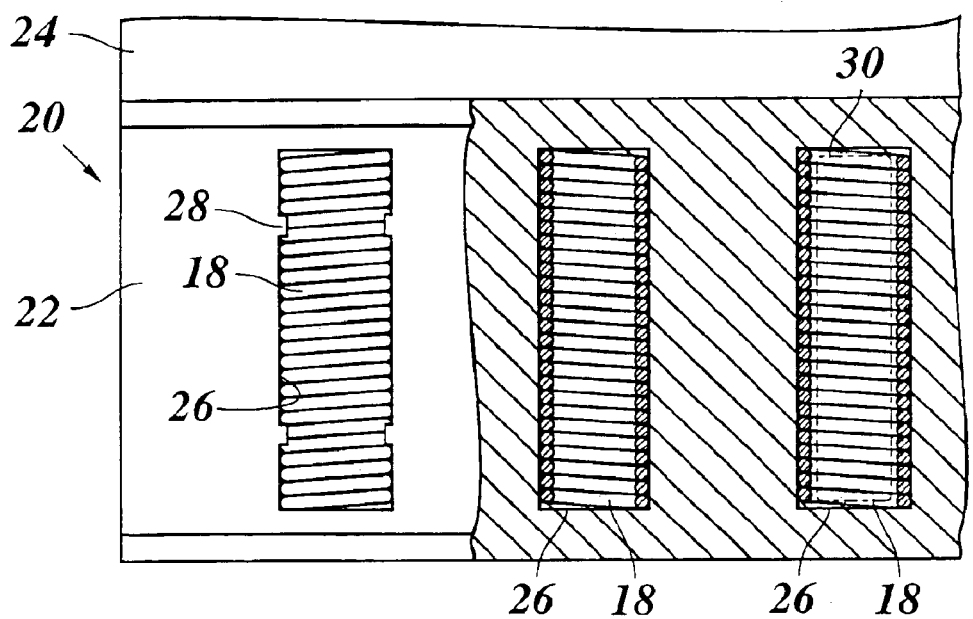
FIG. 2 shows a section of a cage with inserted roll barrels in the state before the installation in the telescopic mechanism.

Before the installation in the telescopic mechanism, the three sections 22 of the cage 20, which are connected with one another by the two flexible cross members 24, can assume the shape of a flat stretched tape, a section of which a shown in FIG. 2. The section 22, in which three helical springs 18 are held in appropriate window-like openings 26 one behind the other in the axial direction of the telescopic mechanism, can be seen there partly in plan view and partly in section. In the upper side of the section 22, visible in FIG. 2, as well as on the invisible reverse side, the walls of the openings 26 have catches 28, which project inward, hold the respective helical spring 18 positively in position and are dimensioned so that the helical springs can be clipped in elastically during the installation.

In the case of the helical spring 18 on the right in FIG. 2, a solid roll 30 is indicated by dots and dashes. The roll 30 is inserted into the helical spring and supports the coils of the helical spring 18 is limited. This roll 30, like the cage 20, has the function of limiting the relative twisting between the internal element 10 and the external element 14. The use of the rolls 30, however, has the advantage that a smooth adjustment of the telescopic mechanism becomes possible even under the stress of a torque.

Figure 3A:
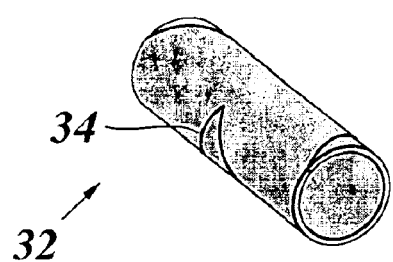
FIGS. 3a and 3b show a perspective view and a blank of a roll barrel of a different embodiment.
Figure 3B:
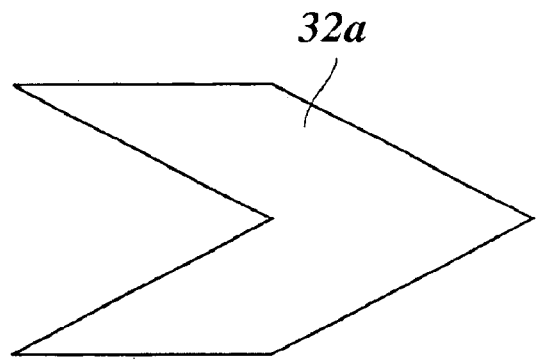

Alternatively, in the example shown in FIGS. 1 and 2, helical springs 18 can also be replaced by differently configured, inherently elastic hollow bodies, such as hollow cylinders with or without a seam. FIG. 3a shows the example of a roll barrel, which is constructed as a hollow cylinder 32 and formed by rolling up the blank 32a shown in FIG. 3b. The ends of the blank abut one another in the finished hollow body 32 and form a seam 34. In the example shown, the seam 34 extends in V-shaped fashion precisely once about the periphery of the hollow cylinder. In this way, it is ensured that the resistance of the roll barrel to the elastic deformation does not change significantly during the course of the rolling motion.

Figure 4A:
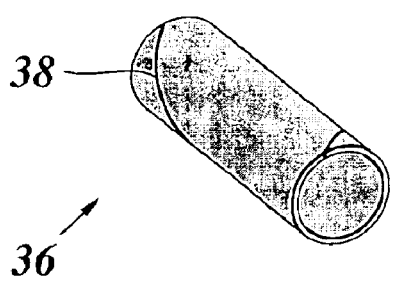
FIGS. 4a to 5b show representations similar to those of FIGS. 3a and 3b for further embodiments.
Figure 4B:
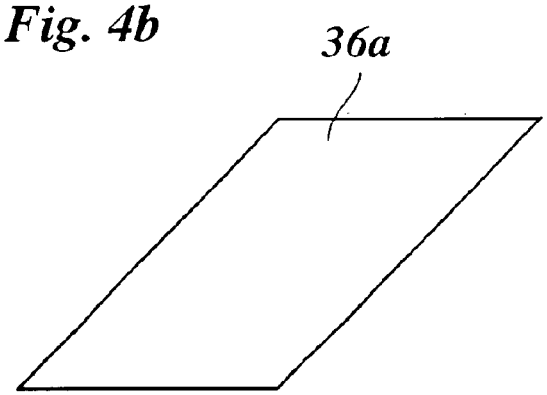

FIG. 4a shows a hollow cylinder 36, which is produced from the blank 36a shown in FIG. 4b. In this case, the seam 38 extends once helically about the periphery of the roll barrel.

Figure 5A:
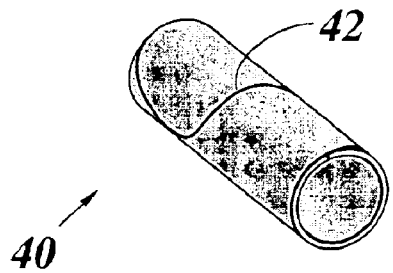
Figure 5B:
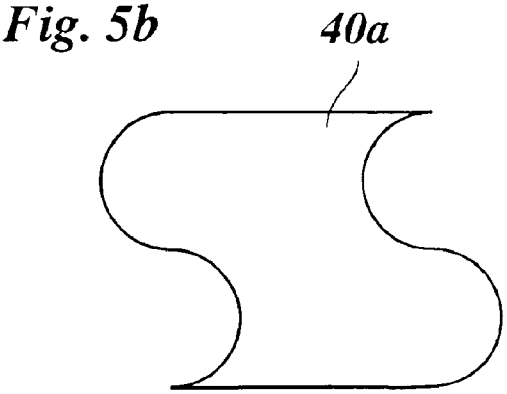

FIG. 5a shows a hollow body 40 of a further example and FIG. 5b shows the associated blank 40a. For this hollow body, the seam 42 extends in an undulating manner. Since the seam 42 does not encircle the periphery of the roll body completely, a slight change in the deformation resistance may arise during overrolling of the seam. Because of the undulating course of the seam, the zone, in which the hollow body has a softer deformation behavior, is distributed over a large angle, so that the differences in the deformation behavior do not become noticeable in a disadvantageous manner. If a plurality of roll barrels are disposed parallel to one another, as shown in FIG. 2, the deformation behavior can be evened out further owing to the fact that the hollow cylinders 40 are inserted in the associated openings 26 in such a manner that their seams 42 in each case are twisted somewhat relative to one another, so that, during a shifting of the telescopic mechanism, they are overrolled in a time-offset manner.

What is claimed is:

1. A telescopic mechanism for steering columns of motor vehicles, comprising:

an internal element which has a flattening at least on one side, an external element which is complementary to the internal element, the internal element and external element being movable relative to each other in an axial direction, and roll barrels for guiding the internal element in the external element, the roll barrels solely being oriented primarily transverse to said axial direction of movement between the external element and internal element and which transmit a steering torque between the internal element and the external element, and which roll barrels roll at the flattening, at least some of the roll barrels constructed as hollow elasticity bodies which are elastically deformable.

2. The telescopic mechanism of claim 1, wherein the hollow bodies are helical springs.

3. The telescopic mechanism of claim 2, wherein the helical springs are tensile springs having coils of which, in an unstressed state, lie against one another on a block.

4. The telescopic mechanism of claim 2, wherein the helical springs are formed from a spring steel with a rectangular cross section.

5. The telescopic mechanism of claim 1, wherein the hollow bodies are hollow cylinders.

6. The telescopic mechanism of claim 5, wherein the hollow cylinders are formed by a rolled-up blank such that ends of the blank abut one another with formation of a seam.

7. The telescopic mechanism of claim 6, wherein the seam extends obliquely to an axis of the respective hollow cylinder.

8. The telescopic mechanism of claim 7, wherein the seam extends around the respective hollow cylinder at least once.

9. The telescopic mechanism of claim 1, wherein the internal element has a polygonal external cross section and forms several flattenings, which are supported in each case over a set of said hollow bodies at a corresponding flattening of an inner cross section of the external element.

10. The telescopic mechanism of claim 1, further comprising a cage which holds the hollow bodies and which fills a space between the internal element and the external element with little clearance and forms a boundary for deformation of an external cross section of the hollow bodies.

11. The telescopic mechanism of claim 10, wherein the cage forms several thickened sections which in each case are assigned to a flattening of the internal element and accommodate a set of hollow bodies and are connected with one another by flexible cross members.

12. The telescopic mechanism of claim 11, wherein the cage is an injection-molded part, which is produced as a stretched tape and is bent at the cross members into a shape corresponding to the external cross section of the internal element.

13. The telescopic mechanism of claim 1, further comprising a solid cylindrical roll which supports an inner surface of the hollow body with clearance, limits elastic deformation of an outer cross section of the hollow body, and is inserted into at least one of the hollow bodies.

14. The telescopic mechanism of claim 3, wherein the helical springs are formed from a spring steel with a rectangular cross section.

15. The telescopic mechanism of claim 2, wherein the internal element has a polygonal external cross section and forms several flattenings, which are supported in each case over a set of said hollow bodies at a corresponding flattening of an inner cross section of the external element.

16. The telescopic mechanism of claim 5, wherein the internal element has a polygonal external cross section and forms several flattenings, which are supported in each case over a set of said hollow bodies at a corresponding flattening of an inner cross section of the external element.

17. The telescopic mechanism of claim 2, further comprising a cage which holds the hollow bodies and which fills a space between the internal element and the external element with little clearance and forms a boundary for deformation of an external cross section of the hollow bodies.

18. The telescopic mechanism of claim 5, further comprising a cage which holds the hollow bodies and which fills a space between the internal element and the external element with little clearance and forms a boundary for deformation of an external cross section of the hollow bodies.

19. The telescopic mechanism of claim 2, further comprising a solid cylindrical roll which supports an inner surface of the hollow body with clearance, limits elastic deformation of an outer cross section of the hollow body, and is inserted into at least one of the hollow bodies.

20. The telescopic mechanism of claim 5, further comprising a solid cylindrical roll which supports an inner surface of the hollow body with clearance, limits elastic deformation of an outer cross section of the hollow body, and is inserted into at least one of the hollow bodies.

* * * * *